United States Patent [19]

Cristie

[11] Patent Number: 4,770,435
[45] Date of Patent: Sep. 13, 1988

[54] FREESTYLE BICYCLE CONSTRUCTION

[75] Inventor: Martin Cristie, Brooklyn, N.Y.

[73] Assignee: North America Tradimpex Cycles, Inc., Melville, N.Y.

[21] Appl. No.: 71,489

[22] Filed: Jun. 29, 1987

[51] Int. Cl.⁴ .............................................. C62L 3/02
[52] U.S. Cl. .................................. 280/279; 74/551.1; 74/551.2; 74/551.4; 188/24.12; 188/24.22
[58] Field of Search ...................... 280/276, 278, 279; D12/111, 112, 107; 74/491, 492, 551.1, 551.2, 551.8; 188/24.22, 24.11, 24.12, 26; 192/35

[56] References Cited

U.S. PATENT DOCUMENTS 4,616,523  10/1986  Jones ................................. 280/279
4,653,768   3/1987  Kegs et al. ........................ 280/279

Primary Examiner—John J. Love
Assistant Examiner—Richard Camby
Attorney, Agent, or Firm—Charles E. Temko

[57] ABSTRACT

An improved freestyle bicycle construction is disclosed, featuring an improved rear wheel caliber brake linkage which can be preassembled while the bicycle is in relatively unassembled condition, thereby facilitating assembly by a merchant or the ultimate user.

3 Claims, 2 Drawing Sheets

FREESTYLE BICYCLE CONSTRUCTION

BACKGROUND OF THE INVENTION

This invention relates generally to the field of bicycles, and more particularly to an improved freestyle bicycle construction in which certain components have been improved from the aspect of facilitating assembly by a merchant or ultimate user prior to use.

Freestyle bicycles and methods of riding and handling the same have been a relatively recent innovation, and are characterized inter alia by the ability of the rider to rotate the handlebars and fork assembly through an infinite degree of rotation in either of two rotational directions, as compared with the standard bicycle in which pivotal movement of the front wheel fork is normally limited to an arc of not over 300°. Freestyle bicycles are nevertheless, equipped with the usual front and rear wheel caliper brakes operated by cables controlled from levers on the handlebars. Instead of direct interconnection to the rear calipers, it is common to provide a pair of annular rotors concentrically located with respect to the front fork stem with cable segments arranged so that relative rotational movement between the rotors is not hindered, while axial movement of the interconnecting cables is transmitted from an upper rotor connected to the handlebar lever to the lower rotor which is connected to cables leading to the rear caliper. The front caliper is usually operated by a single cable which passes through the front fork tube which also carries the front caliper. In the usual knock down condition of the bicycle, the rotor structure is unassembled, and assembly often requires substantial time and more than ordinary skills.

SUMMARY OF THE INVENTION

Briefly stated, the invention contemplates an improved freestyle bicycle construction of the class described in which the rear brake caliper linkage and front wheel fork structure have been configured to permit substantially total assembly of those components prior to interconnecting the remaining components, such as the front wheel and the handlebars, so that the bicycle may be shipped in knock-down form for later assembly only of the remaining components.

To this end, the front fork is provided with a fork tube which is substantially axially longer than normal, and threadedly engages a hollow sleeve which supports the upper and lower rotors and rotor return spring. The bicycle in knock-down condition may have the front fork assembled to the front fork stem which forms a part of the frame element. Upon installation of the handlebars, it is necessary only to connect the ends of two cables to the upper rotor.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
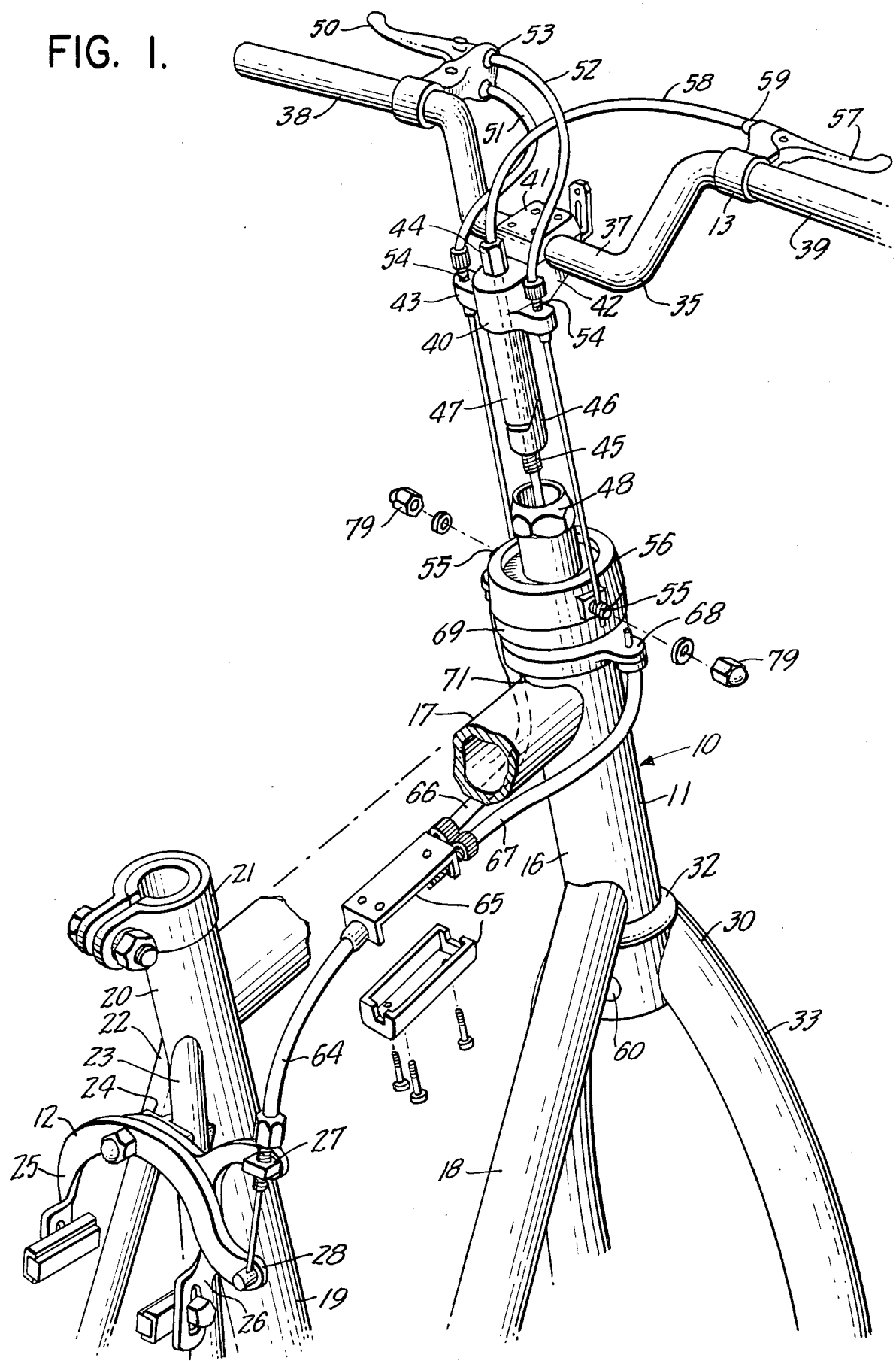
FIG. 1 is a fragmentary exploded view in perspective of a freestyle bicycle embodying the invention.

In accordance with the invention, the device, generally indicated by reference character 10, comprises broadly: a generally conventional frame element 11, a rear caliper brake element 12, a front caliper brake element 13 (partially illustrated) as well as other conventional elements (not shown) well known in the art.

The frame element 11 includes a hollow front stem 16 which supports a front wheel, as well as the upper longitudinal member 17, lower longitudinal member 18, rear vertical member 19, an upper end 20 of which supports a saddle clamp 21. Extending rearwardly of the member 19 are the usual rear fork members 22 and 23 interconnected by a rear caliper support member 24 which pivotally mounts rear caliper members 25 and 26, each having cable-engaging terminals at 27 and 28, respectively.

A front fork element 30 is generally conventional, and includes a hollow stem or tube 31 having a lower enlargement 32 thereon from which wheel supports, one of which is indicated by reference character 32, extend downwardly. A handlebar element 35 is also generally conventional, and includes a central portion 37 as well as manually engageable members 38 and 29. The element 35 is interconnected by handle mounting element 40 including a clamping plate 41 and a main body 42 having a centrally disposed bore 43 penetrated by a hollow bolt 44, a lower threaded end 45 of which engages a wedge member 46 bearing against a cylindrical tube 47 in known manner. With the tightening of the bolt 44, the effective diameter of the tube 47 is enlarged to enable it to engage an inner surface of a fork tube to be subsequently described.

The rear caliper brake element 12 includes a left hand brake lever 50 mounted on member 38 operating first and second cables 51 and 52. The cables include upper terminals 53 and are threaded through supporting bores 54 in the element 40, the lower ends of the cables studs 55 on an upper rotor 56. The right hand lever 57 is provided with a single cable 58 having an upper terminal 59, and a lower terminal (not shown), the cable extending through an opening 60 to operate the front caliper (not shown).

Referring again to FIG. 1, motion is transmitted to terminals 27 and 28 through a rear single cable 64 which interconnects through a known interconnecting member 65 which interconnects, in turn, with dual cables 66 and 67 which project through openings in a guide plate 68 to interconnect with a lower rotor 69 in known manner.

Figure 2:
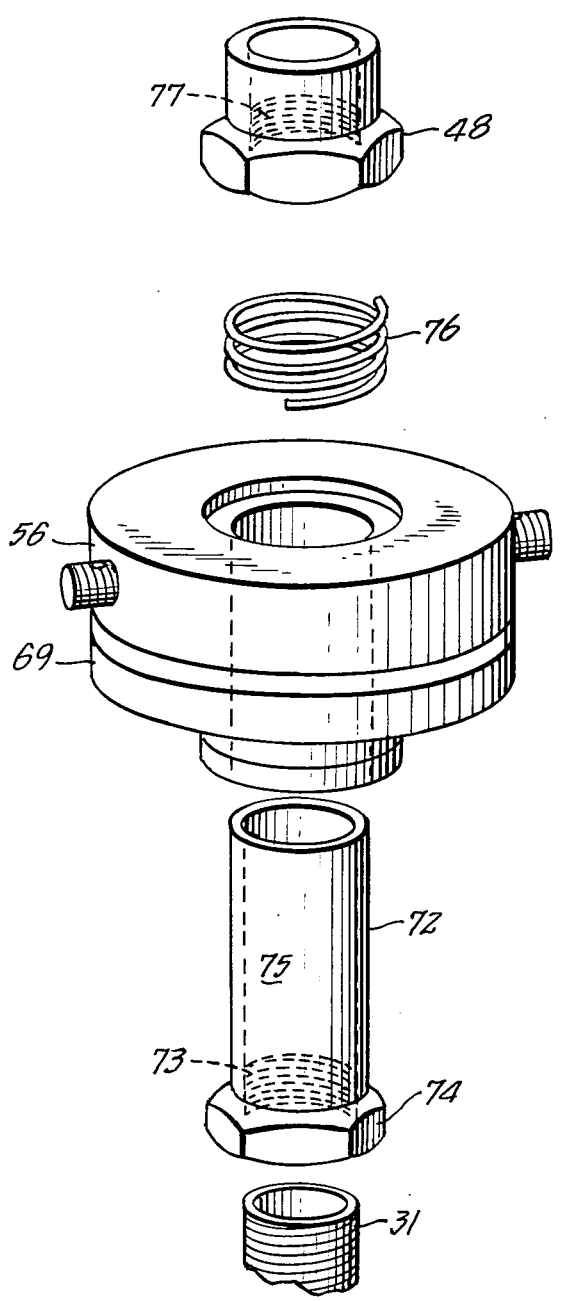
FIG. 2 is an exploded view in perspective showing the upper and lower rotors in detached condition relative to the frame element of the bicycle.

Referring to FIG. 2, there is illustrated in larger scale, components which may be preassembled upon the stem 16 at the upper end 71 thereof. The fork tube 31 while otherwise conventional, will normally be approximately two inches longer than normal, and extends above the upper end of the stem 16 that distance. It is surrounded by a cylindrical sleeve 72, a lower end 73 of which is threaded and provided with tool-engaging surfaces 74 so as to be engageable upon the fork tube. The outer surface of the sleeve 72, indicated by reference character 75 is cylindrical, and supports the upper rotor 56 and lower rotor 69 to permit free rotation thereon. The rotor return spring 76 is positioned thereabove.

The head lock nut 48 is provided with a lower countersunk threaded portion 77 which serves to limit the degree of engagement upon the fork tube, and thereby avoid binding of the upper and lower rotors, while securing the front fork to the stem 16.

It will be apparent from a consideration of the drawing, that all of the components disposed between the head lock nut 48 and fork tube 31 may be preassembled on the frame element 11 independently of engaging the handlbar element 35 which is secured to the fork tube in a normal manner. During subsequent assembly of the remaining components of the device 10, it will be necessary only to connect the lower ends of the cables 51 and 52 to the upper rotor 56, using threaded nuts 79 for this purpose. Should it be necessary to disassemble the bicycle for shipping, this structure remains intact once the cables 51 and 52 have been again disconnected.

Figure 3:
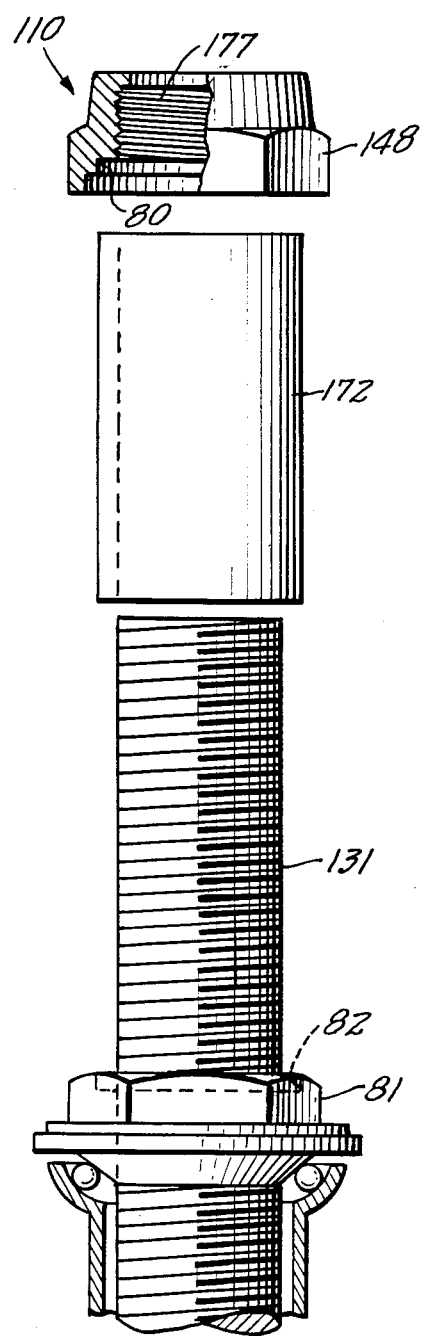
FIG. 3 is a schematic fragmentary exploded view in elevation, partly in section, of an alternate form of the embodiment.

Turning now to the alternate form of the embodiment shown in FIG. 3, and designated by reference character 110, parts corresponding to those of the principal form have been designated by similar reference characters with the additional prefix "1".

The alternate form differs from the principal form in the elimination of internal threads in the tube 172, and the position of an additional countersunk 80 to accommodate the sleeve 172 at the upper end thereof. The fork lock nut 81 is provided with a corresponding counter sink 82 to accommodate the lower end of the sleeve 172.

Thus, this form eliminates the need of any threading operations in the manufacture of the sleeve 172, which is clamped upon assembly between the upper and lower lock nuts 148 and 81 which threadedly engage the fork tube 131.

I wish it to be understood that I do not consider the invention to be limited to the precise details of structure shown and set forth in this specification, for obvious modifications will occur to those skilled in the art to which the invention pertains.

I claim:

1. In a freestyle bicycle including a frame element having a front stem, a front fork supporting a front wheel, said fork having a hollow tube projecting through said stem for relative rotation therewith, handlebars supported by said tube, and rear wheel caliper brake means controlled from a lever on said handlebars, said brake element including upper and lower rotors capable of relative rotation to permit said fork to be rotated in either of two rotational directions in infinite degree, the improvement comprising: said fork tube being substantially longer than said stem and having an upper end portin thereof extending outwardly of said stem; a hollow sleeve engaged upon said upper end portion of said fork tube, said sleeve having an outer cylindrical surface, said upper and lower rotors being rotationally positioned on said outer surface; a rotor spring positioned concentrically upon said stem above said upper rotor, and a head lock nut having an internally threaded lower end disposed above said return spring and engaged upon said upper end portion of said tube.

2. The improvement set forth in claim 1, further characterized in said hollow sleeve having internal threads at a lower end thereof engaged upon said upper end portion of said fork tube, said head lock nut being countersunk to avoid binding of said hollow sleeve.

3. The improvements set forth in claim 1, further characterized in said hollow sleeve being completely free of threading, and maintained upon said fork tube by the engagement of said head lock nut upon said fork tube.

* * * * *